(12) United States Patent
Colombo et al.

(10) Patent No.: US 10,705,240 B2
(45) Date of Patent: Jul. 7, 2020

(54) CAPACITIVE ELECTROMAGNETIC FORMATION SURVEILLANCE USING PASSIVE SOURCE

(71) Applicant: Saudi Arabian Oil Company, Dhahran (SA)

(72) Inventors: Daniele Colombo, Dhahran (SA); Gary W. McNeice, Dhahran (SA); Brett W. Bouldin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 57 days.

(21) Appl. No.: 15/974,970

(22) Filed: May 9, 2018

(65) Prior Publication Data
US 2018/0329103 A1 Nov. 15, 2018

Related U.S. Application Data

(60) Provisional application No. 62/504,962, filed on May 11, 2017.

(51) Int. Cl.
*G01V 3/12* (2006.01)
*G01V 3/08* (2006.01)
(Continued)

(52) U.S. Cl.
CPC .............. *G01V 3/12* (2013.01); *E21B 47/122* (2013.01); *E21B 47/124* (2013.01); *G01V 3/082* (2013.01);
(Continued)

(58) Field of Classification Search
CPC . G01V 3/12; G01V 3/10; G01V 3/088; G01V 3/083; G01V 3/265; G01V 3/082; E21B 47/122; E21B 47/124
See application file for complete search history.

(56) References Cited

U.S. PATENT DOCUMENTS

| 4,349,781 A | 9/1982 | Vozoff |
| 6,393,363 B1 | 5/2002 | Wilt et al. |

(Continued)

FOREIGN PATENT DOCUMENTS

| CN | 102667530 | 9/2012 |
| GB | 2410090 | 7/2005 |
| WO | 2005085909 | 9/2005 |

OTHER PUBLICATIONS

Aziz et al., "Surface-to-borehole TEM for reservoir monitoring," SEG-2011-1882, Society of Exploration Geophysicists, 2011 SEG Annual Meeting, Texas, Sep. 18-23, 2011, 5 pages.
(Continued)

*Primary Examiner* — Dominic E Hawkins
(74) *Attorney, Agent, or Firm* — Fish & Richardson P.C.

(57) ABSTRACT

Naturally-occurring, electromagnetic signals generated by interaction of solar wind with earth's magnetosphere adjacent a borehole are measured by an electromagnetic sensor positioned adjacent the borehole in the hydrocarbon-bearing formation. Electromagnetic signals generated within the borehole are measured over a period of time by a borehole sensor positioned within the borehole. The electromagnetic signals change over the period of time due to variations in fluid distributions within the hydrocarbon-bearing formation. Electromagnetic changes to the electromagnetic signals generated within the borehole and to the passive, naturally-occurring electromagnetic signals over the period of time are determined by one or more processors. A computational model of the hydrocarbon-bearing formation is generated based in part on the electromagnetic changes.

17 Claims, 14 Drawing Sheets

(51) Int. Cl.
*E21B 47/12* (2012.01)
*G01V 3/10* (2006.01)
*G01V 3/26* (2006.01)

(52) U.S. Cl.
CPC .............. *G01V 3/083* (2013.01); *G01V 3/088* (2013.01); *G01V 3/10* (2013.01); *G01V 3/265* (2013.01)

(56) References Cited

U.S. PATENT DOCUMENTS

| | | | |
|---|---|---|---|
| 6,426,917 | B1 | 7/2002 | Tabanou et al. |
| 6,739,165 | B1 | 5/2004 | Strack |
| 7,599,803 | B2 * | 10/2009 | Scott ...................... G01N 22/00 702/24 |
| 7,675,813 | B2 | 3/2010 | Valero et al. |
| 8,106,791 | B2 | 1/2012 | Thompson et al. |
| 8,390,471 | B2 | 3/2013 | Coates et al. |
| 8,392,119 | B2 | 3/2013 | Alumbaugh et al. |
| 8,638,103 | B2 | 1/2014 | Rosthal et al. |
| 8,680,866 | B2 | 3/2014 | Marsala et al. |
| 8,816,689 | B2 | 8/2014 | Colombo et al. |
| 8,901,931 | B2 | 12/2014 | Esmersoy |
| 8,947,093 | B2 | 2/2015 | Alumbaugh et al. |
| 9,739,905 | B2 | 8/2017 | Sena |
| 10,067,255 | B2 | 9/2018 | Colombo et al. |
| 2004/0160223 | A1 * | 8/2004 | McElhinney ............ G01V 7/00 324/346 |
| 2007/0075890 | A1 * | 4/2007 | Jackson ................. G01V 3/082 342/22 |
| 2007/0239402 | A1 * | 10/2007 | Scott ...................... G01N 22/00 702/189 |
| 2009/0039889 | A1 | 2/2009 | Wilt et al. |
| 2010/0259268 | A1 | 10/2010 | Zhang et al. |
| 2011/0001482 | A1 * | 1/2011 | Alumbaugh ........... G01V 3/088 324/344 |
| 2011/0036569 | A1 * | 2/2011 | Bass ........................ G01V 3/28 166/250.16 |
| 2011/0308789 | A1 | 12/2011 | Zhang et al. |
| 2012/0191353 | A1 | 7/2012 | Wilt et al. |
| 2012/0293179 | A1 | 11/2012 | Colombo et al. |
| 2013/0300419 | A1 * | 11/2013 | Hibbs .................... G01V 3/088 324/348 |
| 2015/0061684 | A1 | 3/2015 | Marsala et al. |
| 2015/0101817 | A1 * | 4/2015 | White .................... E21B 7/046 166/308.1 |
| 2015/0369949 | A1 | 12/2015 | Cuevas et al. |
| 2015/0378044 | A1 * | 12/2015 | Brooks ................... G01P 15/00 702/9 |
| 2017/0097441 | A1 * | 4/2017 | Eiskamp .................. E21B 7/04 |
| 2017/0146681 | A1 | 5/2017 | Cuevas et al. |

OTHER PUBLICATIONS

Azizuddin et al., "Surface-to-borehole TEM for Reservoir Monitoring," SEG San Antonio 2011 Annual Meeting, 5 pages.
Colombo and McNeice, "Geophysical monitoring of waterflooding in Saudi Arabia: Methods and perspectives," SEG Annual Meeting Expanded Abstracts, SEG International Exposition and 87th Annual Meeting, Sep. 2017, 5 pages.
Colombo and McNeice, "Surface to borehole CSEM for waterflood monitoring in a supergiant oilfield in Saudi Arabia: data analysis," 2018, 5 pages.
Colombo and Rovetta, "Geophysical joint inversion with multiple coupling operators," 88th Annual international Meeting, SEG Expanded Abstracts, 2018, 5 pages.
Colombo et al., "Feasibility study of surface-to-borehole CSEM for oil-water fluid subsition in Ghawar Field," KMS Technologies—KJT Enterprises, Inc., Saudi Arabia, Geo 2010, poster, 4 pages.
Dogru et al., "A next-generation parallel reservoir simulator for giant reservoirs," SPE Journal Paper 119272, presented at the Reservoir Simulation Symposium in the Woodlands, Texas, Feb. 2009, 29 pages.
McNeice and Colombo, "3D inversion of surface to borehole CSEM for waterflood monitoring," 2018, 4 pages.
Wilt et al., "Cross-borehole electromagnetic induction for reservoir characterization," SPE-23623-MS, 61st Annual International Meeting, SEG Expanded Abstracts, Mar. 8-11, 1991, 4 pages.
Wilt et al., "Crosswell electromagnetic tomography: System design consideration and field results," Geophysics, vol. 60, Mar. 1991, 4 pages.
Sabbione et al, "Automatic first-breaks picking: New strategies and algorithms," Geophysics, 75(4), pp. 67-76, Jul. 2009.
Schmidhuber et al, "Deep learning in neural networks: An overview: Neural Networks," Elsevier, Neural Networks, vol. 61, Jan. 2015, pp. 85-117.
Colombo and McNeice, "Quantifying surface-to-reservoir electromagnetics for waterflood monitoring in a Saudi Arabian carbonate reservoir," Geophysics vol. 78, No. 6, Nov.-Dec. 2013, 17 pages.
International Search Report and Written Opinion issued in International Application No. PCT/US2018/032030 dated Aug. 2, 2018, 16 pages.

* cited by examiner

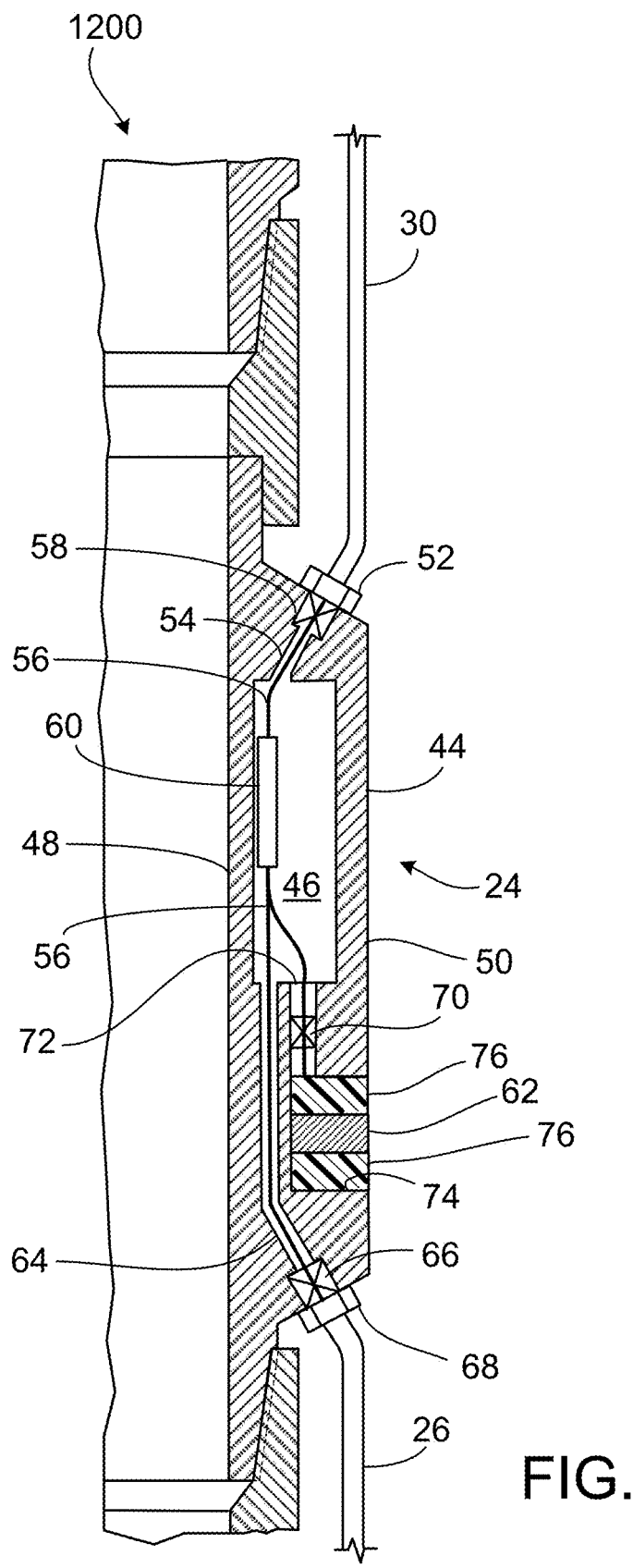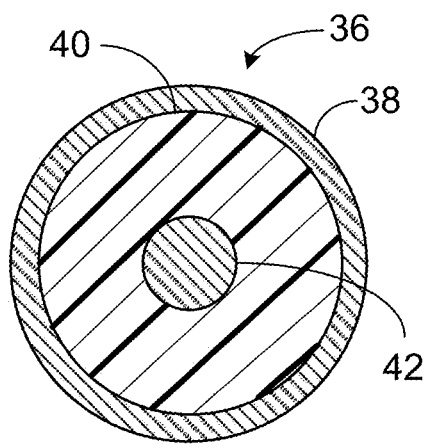
FIG. 12B
FIG. 12A

CAPACITIVE ELECTROMAGNETIC FORMATION SURVEILLANCE USING PASSIVE SOURCE

CROSS REFERENCING TO RELATED APPLICATIONS

This application claims the benefit of priority to U.S. Application No. 62/504,962, entitled "Capacitive Electromagnetic Formation Surveillance Using Passive Source" filed May 11, 2017, which is incorporated herein by reference in its entirety.

TECHNICAL FIELD

This disclosure relates to monitoring a hydrocarbon-bearing formation from which hydrocarbons can be produced.

BACKGROUND

Electromagnetic signals are sensitive to fluids, particularly, to the specific composition of fluids. For example, saline brines that are sometimes used to produce hydrocarbons are highly conductive and generate a resistivity contrast of one or more orders of magnitude relative to in-situ oil. When saline water displaces oil in the hydrocarbon-bearing formation, such changes can be tracked by measuring the relative variations of the electromagnetic signals taken before and after the saline water has displaced the oil. Because the conditions in the formation change over time, absolute repeatable measurements over long periods of time can be problematic. Repeated measurements over time are also affected by the durability of instrumentation deployed to take such measurements.

SUMMARY

This specification describes technologies relating to capacitive electromagnetic formation surveillance using a passive source.

An example implementation of the subject matter described within this disclosure is a method of monitoring a hydrocarbon-bearing formation with the following features. Naturally-occurring, electromagnetic signals generated by interaction of solar wind with earth's magnetosphere adjacent a borehole are measured by an electromagnetic sensor positioned adjacent the borehole in the hydrocarbon-bearing formation. Electromagnetic signals generated within the borehole are measured over a period of time by a borehole sensor positioned within the borehole. The electromagnetic signals change over the period of time due to variations in fluid distributions within the hydrocarbon-bearing formation. Electromagnetic changes to the electromagnetic signals generated within the borehole and to the passive, naturally-occurring electromagnetic signals over the period of time are determined by one or more processors. A computational model of the hydrocarbon-bearing formation is generated based in part on the electromagnetic changes.

Aspects of the example implementation, which can be combined with the example implementation alone or in combination, include the following. The electromagnetic signals are naturally generated within the borehole.

Aspects of the example implementation, which can be combined with the example implementation alone or in combination, include the following. The borehole sensor includes a tri-axial electromagnetic sensor configured to measure magnetic signals and electric field signals within the borehole.

Aspects of the example implementation, which can be combined with the example implementation alone or in combination, include the following. Either the electromagnetic sensor or the borehole sensor includes a capacitive electric field sensor.

Aspects of the example implementation, which can be combined with the example implementation alone or in combination, include the following. The period of time over which the electromagnetic signals are measured is in the order of weeks or more.

Aspects of the example implementation, which can be combined with the example implementation alone or in combination, include the following. The electromagnetic signals are measured over a range of frequencies over the period of time.

Aspects of the example implementation, which can be combined with the example implementation alone or in combination, include the following. Determining the electromagnetic changes to the electromagnetic signals over the period of time includes determining, from among the range of frequencies, a sub-range of frequencies at which a majority of the electromagnetic changes over the period of time were measured and a magnitude of the electromagnetic changes at the sub-range of frequencies. A skin depth of changes to the passive, naturally-occurring electromagnetic signals over the period of time is numerically determined based on the sub-range of frequencies and based on a resistivity of the hydrocarbon-bearing formation. An intensity of electric and magnetic field variations resulting from the naturally-occurring electromagnetic signals is determined in order to determine corresponding field variations within the borehole.

Aspects of the example implementation, which can be combined with the example implementation alone or in combination, include the following. Determining the electromagnetic changes to the electromagnetic signals over the period of time includes identifying an electromagnetic signal value measured at each time instant of multiple time instants. A passive, naturally-occurring, electromagnetic signal measured at each corresponding time instant of multiple time instants is identified. A ratio of the electromagnetic signal value and the passive, naturally-occurring, electromagnetic signal measured at each corresponding time instant of time instants is determined.

Aspects of the example implementation, which can be combined with the example implementation alone or in combination, include the following. The passive, naturally-occurring, electromagnetic signals generated by the interaction of solar wind with earth's magnetosphere adjacent the borehole is processed by stacking to reduce an effect of noise. The electromagnetic signals generated within the borehole are processed by stacking to reduce an effect of noise.

An example implementation of the subject matter described within this disclosure is a hydrocarbon-bearing formation monitoring system with the following features. An electromagnetic sensor is positioned adjacent to a borehole formed in a hydrocarbon-bearing formation. The electromagnetic sensor is capable of measuring passive, naturally-occurring, electromagnetic signals generated by interaction of solar wind with earth's magnetosphere adjacent the borehole. A borehole sensor is positioned within the borehole. The borehole sensor is capable of measuring, over a period of time, electromagnetic signals generated within the borehole. The electromagnetic signals change over the period of time due to variations in fluid distributions within the hydrocarbon-bearing formation. A computer system includes one or more processors and a computer-readable medium storing instructions executable by the one or more processors to perform operations. Electromagnetic changes to the electromagnetic signals generated within the borehole and to the passive, naturally-occurring electromagnetic signals are determined over the period of time. A computational model of the hydrocarbon-bearing formation is generated based in part on the electromagnetic changes.

Aspects of the example system, which can be combined with the example system alone or in combination, include the following. The electromagnetic sensor includes a first capacitive electric-field sensor. The first capacitive electric-field sensor includes a first set of plates configured to detect fluctuating passive, naturally-occurring electric fields adjacent the borehole. A first electrical circuitry is connected to the first set of plates. The fluctuating passive, naturally-occurring electric fields induce a first displacement current in the first electrical circuitry.

Aspects of the example system, which can be combined with the example system alone or in combination, include the following. The borehole sensor includes a second capacitive electric-field sensor. The second capacitive electric-field sensor includes a second set of plates that configured to receive fluctuating electric fields from within the borehole. A second electrical circuitry is connected to the second set of plates. The fluctuating electric fields induce a second displacement current in the second electrical circuitry.

Aspects of the example system, which can be combined with the example system alone or in combination, include the following. The borehole sensor includes a tri-axial electromagnetic sensor configured to measure magnetic signals and electric field signals within the borehole.

Aspects of the example system, which can be combined with the example system alone or in combination, include the following. The electromagnetic changes to the electromagnetic signals generated within the borehole and to the passive, naturally-occurring electromagnetic signals over the period of time are determined based on the first displacement current and the second displacement current.

Aspects of the example system, which can be combined with the example system alone or in combination, include the following. Determining electromagnetic changes to the electromagnetic signals generated within the borehole and to the passive, naturally-occurring electromagnetic signals occurs over the period of time. Ratios of the electromagnetic signals generated within the borehole and the passive, naturally-occurring electromagnetic signals over the period of time are determined. An impedance of the hydrocarbon-bearing formation in which the borehole is formed is determined based on the determined ratios.

Aspects of the example system, which can be combined with the example system alone or in combination, include the following. The period of time over which the electromagnetic signals are measured is in the order of weeks or more.

Aspects of the example system, which can be combined with the example system alone or in combination, include the following. Each of the electromagnetic sensor and the borehole sensor measure electromagnetic signals over a range of frequencies over the period of time.

Aspects of the example system, which can be combined with the example system alone or in combination, include the following. The electromagnetic changes to the electromagnetic signals over the period of time are determined. A sub-range of frequencies at which a majority of the electromagnetic changes over the period of time were measured and a magnitude of the electromagnetic changes at the sub-range of frequencies is determined from among the range of frequencies. A skin depth of changes to the passive, naturally-occurring electromagnetic signals over the period of time are numerically determined based on the sub-range of frequencies and based on a resistivity of the hydrocarbon-bearing formation. An intensity of electric and magnetic field variations resulting from the naturally-occurring electromagnetic signals is used to determine corresponding field variations within the borehole.

An example implementation of the subject matter described within this disclosure is a hydrocarbon-bearing formation monitoring system with the following features. An electromagnetic sensor is positioned adjacent to a borehole formed in a hydrocarbon-bearing formation. The electromagnetic sensor is configured to measure passive, naturally-occurring, electromagnetic signals generated by interaction of solar wind with earth's magnetosphere adjacent the borehole. The electromagnetic sensor includes a first capacitive electric-field sensor with a first set of plates configured to detect fluctuating passive, naturally-occurring electric signals adjacent the borehole. A first electrical circuitry is connected to the first set of plates. The fluctuating passive, naturally-occurring electric signals induces a first displacement current in the first electrical circuitry. A borehole sensor is positioned within the borehole. The borehole sensor is configured to measure, over a period of time, electromagnetic signals generated within the borehole. The electromagnetic signals change over the period of time due to variations in fluid distributions within the hydrocarbon-bearing formation. The borehole sensor includes a second capacitive electric-field sensor with a second set of plates configured to receive fluctuating electric signals from within the borehole. A second electrical circuitry is connected to the second set of plates. The fluctuating electric signals induce a second displacement current in the second electrical circuitry. A computer system includes one or more processors and a computer-readable medium storing instructions executable by the one or more processors to perform operations. The operations include determining electromagnetic changes to the electromagnetic signals generated within the borehole and to the passive, naturally-occurring electromagnetic signals over the period of time and generating a computational model of the hydrocarbon-bearing formation based in part on the electromagnetic changes.

Aspects of the example system, which can be combined with the example implementation alone or in combination, include the following. The electromagnetic changes to the electromagnetic signals generated within the borehole and to the passive, naturally-occurring electromagnetic signals over the period of time are determined based on the first displacement current and the second displacement current.

The details of one or more implementations of the subject matter described in this specification are set forth in the accompanying drawings and the description. Other features, aspects, and advantages of the subject matter will become apparent from the description, the drawings, and the claims.

BRIEF DESCRIPTION OF THE DRAWINGS

FIG. 12A is a sectional view of a downhole tool with an electromagnetic sensor.

FIG. 12B is a cross sectional view of a tubing encased conductor.

Like reference numbers and designations in the various drawings indicate like elements.

DETAILED DESCRIPTION

Figure 1:
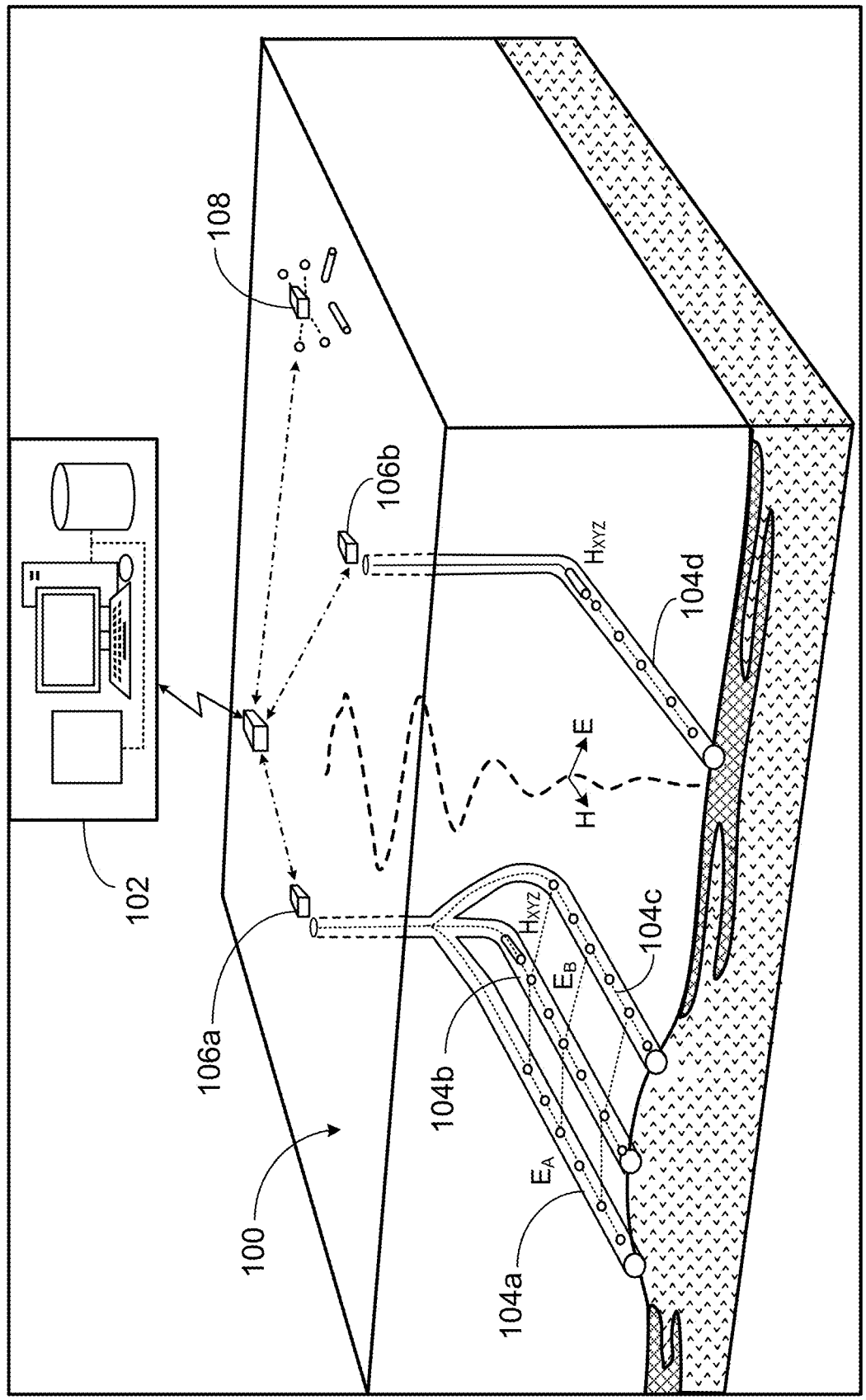
FIG. 1 is a schematic diagram of a hydrocarbon-bearing formation in which an electromagnetic monitoring system is deployed.

This disclosure describes electromagnetic monitoring of hydrocarbon-bearing formations using electric field measurements to monitor sensitivity of fluids in the formations. The electric field measurements are implemented by capacitive coupling of borehole electric field sensors that are installed (for example, permanently installed) in the formations and are isolated from the fluids (for example, hydrogen sulfide ($H_2S$)) circulating in the formation. Such deployment of electric field sensors in the formation decreases or eliminates the need to maintain the sensors.

This disclosure also discloses monitoring a hydrocarbon-bearing formation with electromagnetic techniques that use passive, naturally-occurring electromagnetic signals generated by the interaction of the solar wind with earth's magnetosphere. The magnetic field pulsations generated by this interaction travel to Earth's surface and generate electric currents by electromagnetic induction. In some implementations, such electromagnetic signals are continuously monitored at the formation over long periods of time to detect variations in fluid distribution in the reservoir generated by hydrocarbon recovery operations, for example, water flooding, steam or carbon dioxide injection, or other primary or secondary recovery techniques (or both). As described later, the parameter to be monitored is the variation of electromagnetic response functions as a function of time calculated between at least two electromagnetic field components located either at a single observation point or at two, separate observation points. The response functions can be, for example, the electromagnetic impedance ($Z(t)$) determined by dividing the electric field by the magnetic field or simply electric-electric response functions. The magnetic or electric field sensor used to derive these response functions can be located in the same borehole, another borehole or on the surface.

In some implementations, boreholes (for example, horizontal or vertical boreholes) can be equipped with sensors that provide tri-axial electromagnetic measurements (electric and magnetic fields). The continuous, natural electromagnetic signals from such boreholes can be recorded over time. In this manner, an inexpensive, real-time system to continuously monitor fluid changes in the reservoir through electromagnetic impedance estimation can be obtained. The operations are passive, listening to the electromagnetic fields generated in space and distorted by the reservoir fluids under analysis. Implementing the techniques described here can be cheaper than running active-source electromagnetic surveys. The signals are also available 24 hours a day. Implementing the techniques described here will improve reliability and stability because a large quantity (for example, billions) of impedance estimates covering a broad frequency range can be recorded during the monitoring process.

The techniques described in this specification can be implemented for one or more of multiple applications related to oil, gas and water exploration, monitoring, and recovery (primary, secondary or enhanced) of hydrocarbons from the formation. The applications can include borehole passive electromagnetic logging in which the tri-axial borehole tool is used as a retrievable device to collect low-frequency passive electromagnetic data. The applications can include borehole passive electromagnetic exploration in which the borehole passive electromagnetic devices can be used to explore the space around the borehole, in between boreholes, below the bottom of the borehole, between the sensor position in the borehole, any combination of them, and the surface. The applications can include borehole passive electromagnetic monitoring in which the borehole passive electromagnetic devices can be used to collect data in a time-lapse or in a continuous acquisition mode of operation. In such applications, the time-lapse or continuous analysis of signals, the changes in the signals over time, and the time-variable impedance resulting from changes in fluid saturation can be determined.

FIG. 1 is a schematic diagram of a hydrocarbon-bearing formation 100 in which an electromagnetic monitoring system is deployed. In the example formation 100, multiple boreholes (for example, boreholes 104a, 104b, 104c and 104d) have been formed. A first borehole sensor 106a is positioned within the first set of boreholes 104a, 104b and 104c. A second borehole sensor 106b is positioned within the borehole 104d. In some implementations, the first borehole sensor 106a and the second borehole sensor 104a can include a string of multiple sensors. As described later, each borehole sensor can measure naturally-occurring electromagnetic signals which propagate through the formation 100 over a period of time. Response (transfer) functions calculated through taking ratios of the observed electromagnetic signals change over the period of time due to variations in fluid distributions within the hydrocarbon-bearing formation. An electromagnetic sensor 108 is positioned adjacent the boreholes (for example, at the surface of or within the formation 100). The electromagnetic sensor can measure passive, naturally-occurring electromagnetic signals generated by interaction of solar wind with the earth's magnetosphere adjacent the borehole. The signals measured by the sensors are transmitted to a computer system 102 which determines electromagnetic changes to the electromagnetic signals generated within the borehole and to the passive, naturally-occurring electromagnetic signals over the period of time, and generates a computational model of the hydrocarbon-bearing formation based at least in part on the electromagnetic changes.

Figure 2A:
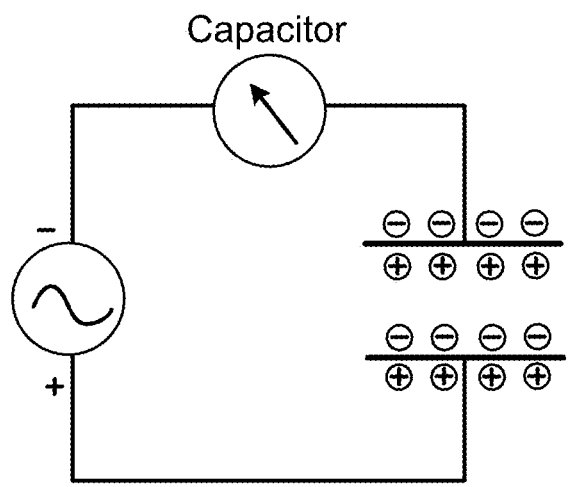
FIGS. 2A-2C are schematic diagrams showing operating principles of an example of a sensor disposed in the hydrocarbon-bearing formation.
Figure 2B:
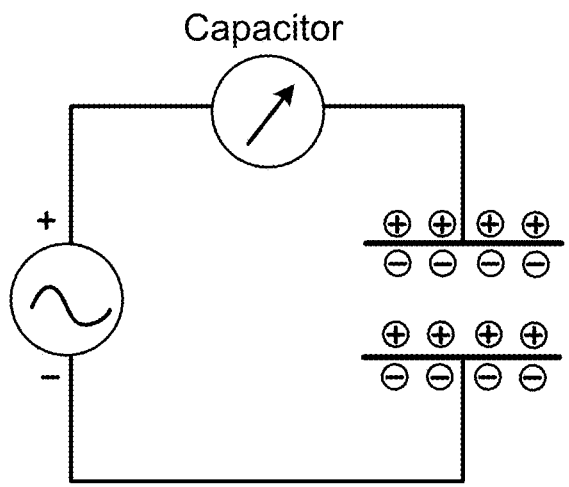
Figure 2C:
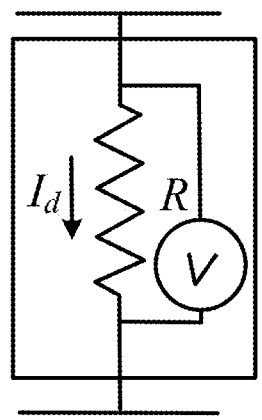

FIGS. 2A-2C are schematic diagrams showing operating principles of an example of a sensor disposed in the hydrocarbon-bearing formation. For example, the sensor 200 can be used as any of the sensors described earlier with reference to FIG. 1. In some implementation, the sensor 200 can be a non-contact capacitive electric-field sensor. For example, the sensor 200 is a low-frequency, tri-axial capacitive electric field sensor, capable of collecting and reporting the electrical fields in three dimensions, the magnetic field in three dimensions, and the change of both in three dimensions over time. The sensor 200 utilizes a capacitive coupling mechanism that can be compared to the function of a capacitor, a schematic of which is shown in FIG. 2A. The plates of the capacitive sensor need not be in galvanic contact with the borehole walls. The plates can receive a fluctuating (for example, alternating) electric field which produces opposite charges on the electrode plates relative to the borehole walls, as shown schematically in FIGS. 2A and 2B. The electrode plates and the borehole are separated by a dielectric material (for example, oil or other dielectric material). The fluctuating electric field induces a displacement current in the circuit (shown schematically in FIG. 2C) which can be monitored to enable modeling the electric field. In this manner, the capacitive electric field sensors can monitor the variations of the electric field induced by the natural magnetic source propagated from the interaction of the solar wind with Earth's magnetosphere.

The sensitivity of the capacitive electric field sensor to sense passive, naturally-occurring electromagnetic fields interacting with the conductive earth and reservoir fluids can be increased by increasing a distance between the plates of the sensor. For example, the distance between the plates can be varied by several meters to adjust the sensitivity.

The sensor 200 can collect both frequency and time-domain electromagnetic field data. The function of the sensor 200 does not depend on the chemical environment surrounding the sensor 200 or on the local wellbore temperature or humidity. The sensor 200 is capable of operating in dry conditions without electrolyte, such as that used in a conventional porous pot electrode, to operate, and so can be deployed permanently at the surface or at the reservoir level without need, of significant routine maintenance. The sensor 200 can either be in contact with the formation 100 or be completely isolated from the interior surface of the borehole. Sensors such as the sensor 200 can be implemented in the hydrocarbon-bearing formation 100 because such sensors are suited for permanent deployment in the formation with long lifespan and minimal (or no) maintenance.

In some implementations, the sensors positioned in the formation 100 can measure electromagnetic signals for periods of time spanning days, weeks, months or longer. The sensors continuously measure the electromagnetic signals from natural source fields which contain broad frequency content. A sample rate of the recording can be tuned depending on the frequency band of interest. In combination with increasing the distance between plates of the capacitive sensor, high measurement (or recording) times (that is, measurement times on the order of days, weeks, months or longer) results in increased sensitivity of the sensors, which, in turn, allows the sensors to measure the passive, naturally-occurring electromagnetic signals both within the borehole and at or near the surface of the formation 100.

Measuring the electric field variations at a single position in the borehole is not sufficient to infer variations in the parameters of the formation 100 using passive measurements because the source amplitude and phase cannot be known. Therefore, the computer system 102 can implement post-processing techniques on the measured electromagnetic signals to determine fluid variations in the formation 100. In some implementations, the computer system 100 determines ratios of the field values, that is, the ratio of the electric components (E) and the coupled magnetic components (H or B) in the frequency domain. The electric components and the coupled magnetic components define elements of the complex impedance tensor Z. The impedance is an intrinsic characteristic of the rock including the fluids in the formation 100, and does not depend on the relative strength of the field signals. To determine the impedance sensor Z, the sensors can measure the magnetic fields concurrently with the electric fields. In some implementations, miniaturized magnetic sensors (for example, fluxgate sensors) can be used directly in the borehole for such concurrent measurement. If the dimensions of the borehole preclude direct deployment of such sensors, the magnetic sensors can be used to measure the reference magnetic field on the surface of the formation 100 and the electric field within the borehole. In some implementations, the computer system 102 can use the electric field measurements alone to determine a ratio or transfer function between electric fields measured by the sensors at separate observation points. In general, the electric field or magnetic field measurements combined with the post-processing to determine ratios remove the dependence on properties of the unknown natural source of the electromagnetic signals and provide the parameters to observe the variations in the formation properties (for example, fluids change).

The passive, naturally-occurring electromagnetic signal spans several decades of frequencies (or periods). The ability of the sensors to measure electromagnetic responses at the formation level depends on the attenuation of the electromagnetic signal caused by the phenomenon known as skin depth and by the evaluation of the most prominent frequency range where the formation fluid variations produce a measurable response. Skin depth is defined as a rate of decay of amplitudes of magnetic fields as a function of the overburden resistivity and frequency of the electromagnetic signals. For example, if the observed passive, naturally-occurring signal contains only low frequencies, then such frequencies cannot be sensitive to small scale formation variations. As described earlier, increasing the plate distance in the capacitive sensors and increasing the duration of measuring the electromagnetic signals can increase the sensitivity of the sensors.

For certain examples, to evaluate the feasibility of passive electromagnetic monitoring of reservoir fluids, numerical modeling was performed to estimate the observed change in passive electromagnetic signal produced by a realistic fluid substitution (for example, a resistivity change). The change in resistivity used in the modeling was derived using accurate reservoir parameters, realistic brine salinity and saturation levels. The feasibility modeling investigation included determining the frequency range and magnitude of the electromagnetic response that will be observed in the reservoir. In addition, the corresponding skin depth of the natural magnetic field variations was determined based on the known resistivity structure and estimated frequency range of the response. The intensity of the natural electric and magnetic field variations were derived using the experimental field measurements. The attenuation determined by forward modeling was used to estimate the fields that would be observed at reservoir level. The remaining electric and magnetic field intensity was compared with the sensitivity achievable from surface and borehole magnetometers and electric field measuring devices.

Figure 3:
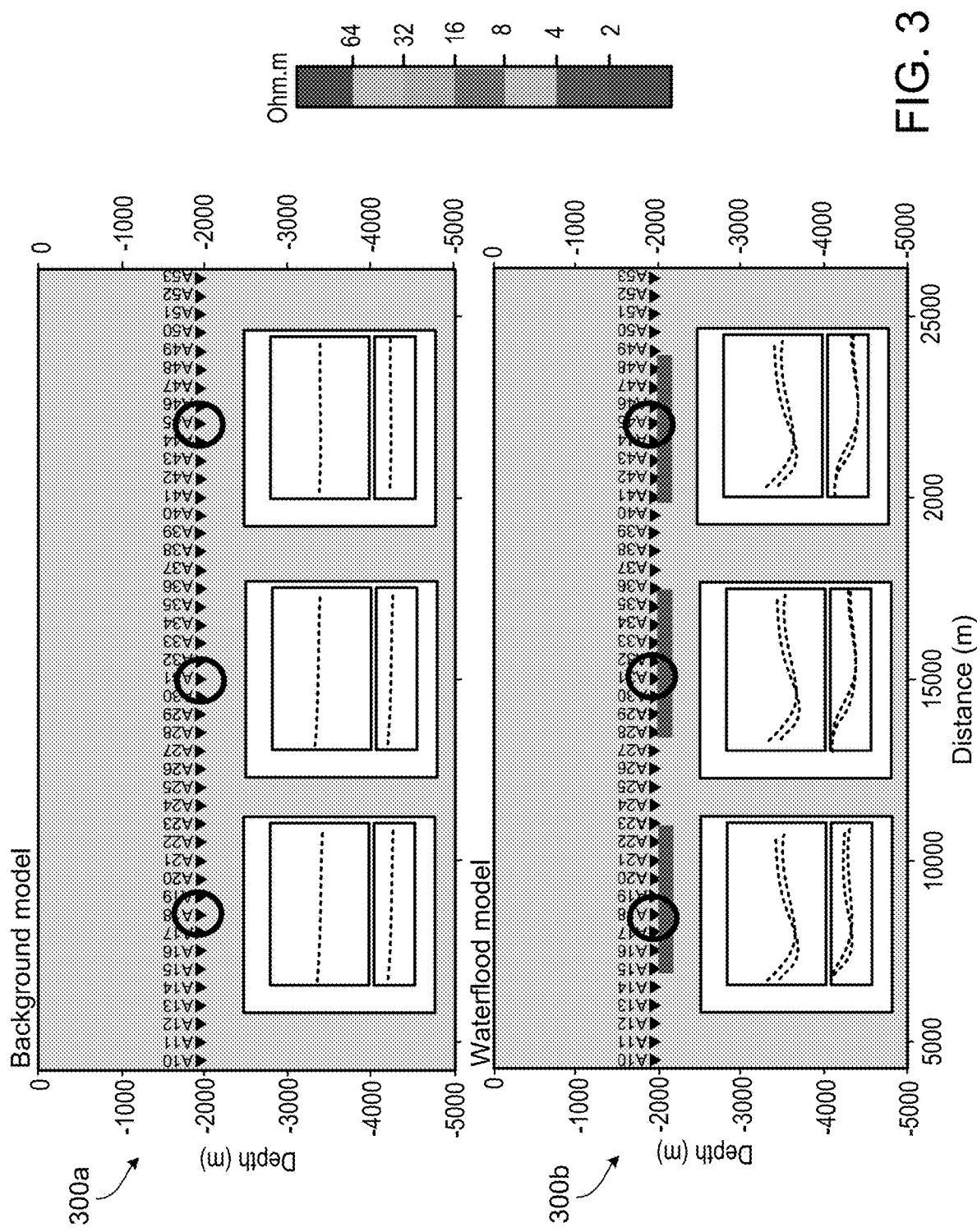
FIG. 3 shows plots illustrating a numerical feasibility study of electromagnetic formation monitoring.

FIG. 3 shows plots illustrating a numerical feasibility study of electromagnetic formation monitoring. In the plots 200a and 200b shown in FIG. 3, the X-axis shows overburden resistivity in Ohm·meter (Ohm·m) and the Y-axis shows depth (that is, distance below the surface). Plot 200a references a background model and plot 200b references a waterflood model. The numerical model includes multiple full electromagnetic receivers (electric field and magnetic field) deployed in a numerical simulation of the formation 100 at a depth of 2000 meters. The formation resistivity is simplified to a half space with an average resistivity derived from well logs. The magneto-telluric-passive electromagnetic (MT EM) curves in terms of apparent resistivity are plotted for three receivers. Both the apparent resistivity (top curve) and the phase (bottom curve) are flat showing no variations for a uniform geology. The bottom portion of FIG. 3 shows patches of water-saturated formation (water saturation, $S_w$=50%) being introduced in the model and the corresponding response curves showing sensitivity to the resistivity variations resulting from the water saturation.

Figure 4:
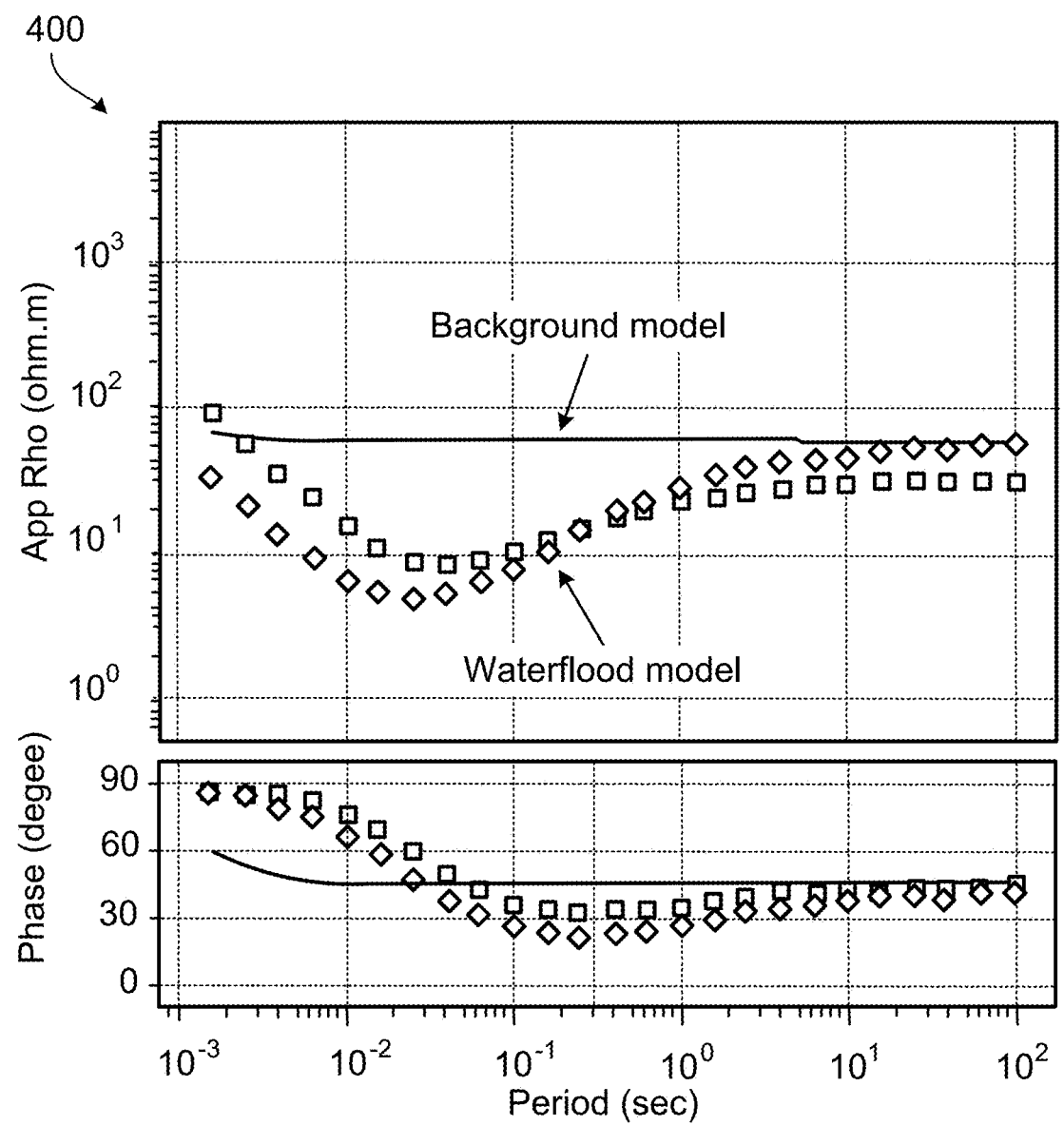
FIG. 4 is a plot illustrating responses observed at a numerical simulation of a receiver located within the numerically simulated formation.

FIG. 4 is a plot 400 illustrating responses observed at a numerical simulation of a receiver located within the numerically simulated formation. In the plot 400 shown in FIG. 4, the X-axis represents the period(s), or 1/frequency, and the Y-axis represents the apparent resistivity (Ohm·m) and phase (degrees). The resistivity change in the model is equivalent to a fluid saturation change from 13% $S_w$ to 50% $S_w$. The maximum apparent resistivity response in the electromagnetic field is in the range of 1 Hertz (Hz) to 100 Hz. By deploying sensors such as those described earlier and that cover the frequency range of between 0.1 Hz and 1000 Hz, the formation 100 can be monitored using the passive, naturally-occurring electromagnetic signals.

Figure 5:
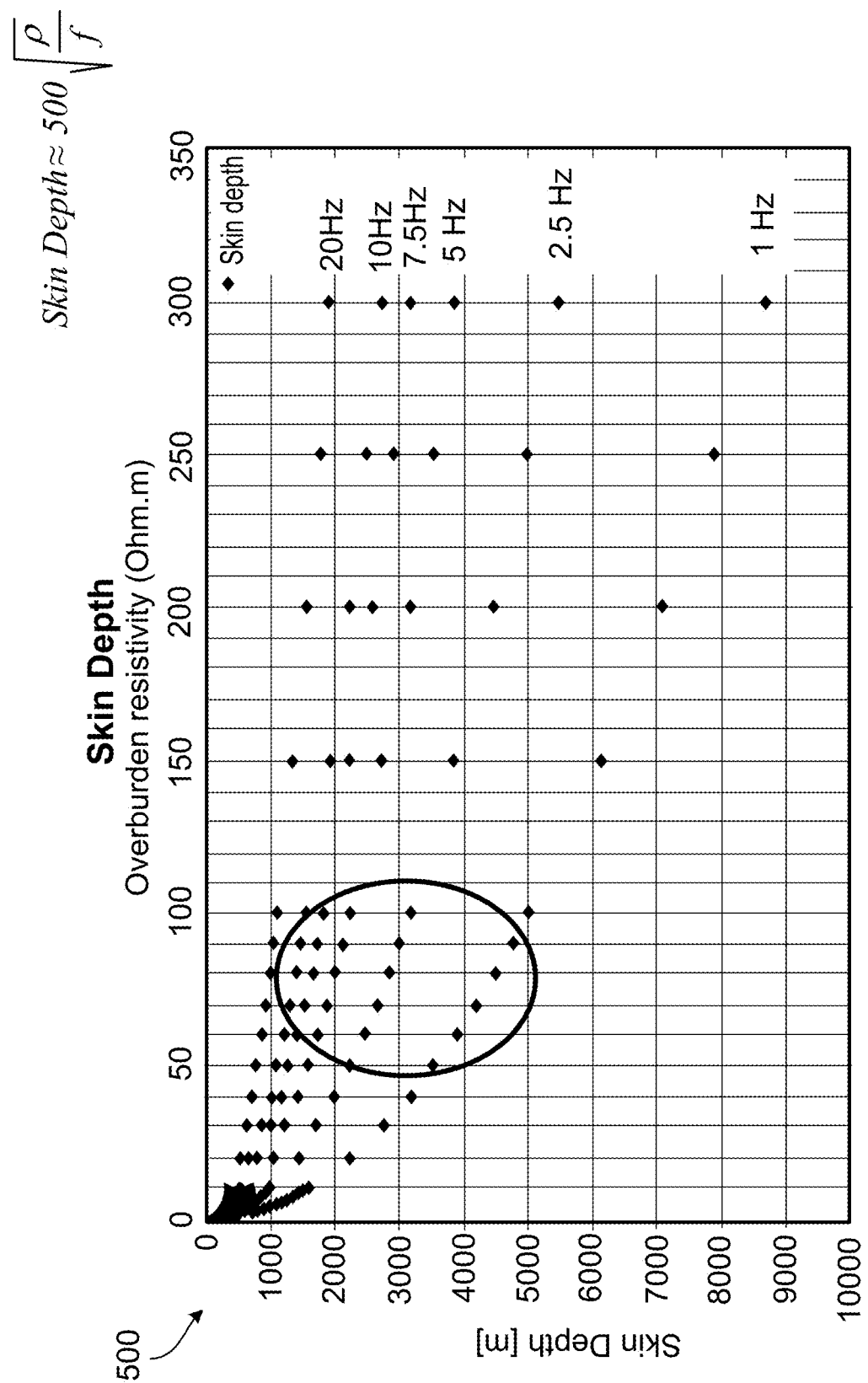
FIG. 5 is a plot of skin depth calculations at different frequencies.

As described earlier, skin depth is a rate of decay of amplitudes of magnetic fields as a function of the overburden resistivity and frequency of the electromagnetic signals. FIG. 5 is a plot 500 of skin depth calculations at different frequencies. In the plot 500 shown in FIG. 5, the X-axis represents overburden resistivity in Ohm·m and the Y-axis shows depth from the surface of the formation. The formation 100 has an average overburden resistivity of 50 Ohm·m to 100 Ohm·m. Based on these resistivities, the skin depths for frequencies between 1 Hz and 10 Hz are within the depth range of typical formations (for example, between 1500 m and 4000 m). Passive, naturally-occurring electromagnetic signals at these depths should reasonably reach the surface of the formation 100 with enough energy to detect electrical impedance variations related to fluid substitution. In general, the applicability of the passive electromagnetic method is generally considered positive if the target is positioned within one skin depth for the specific frequency and resistivity structure.

Figure 6:
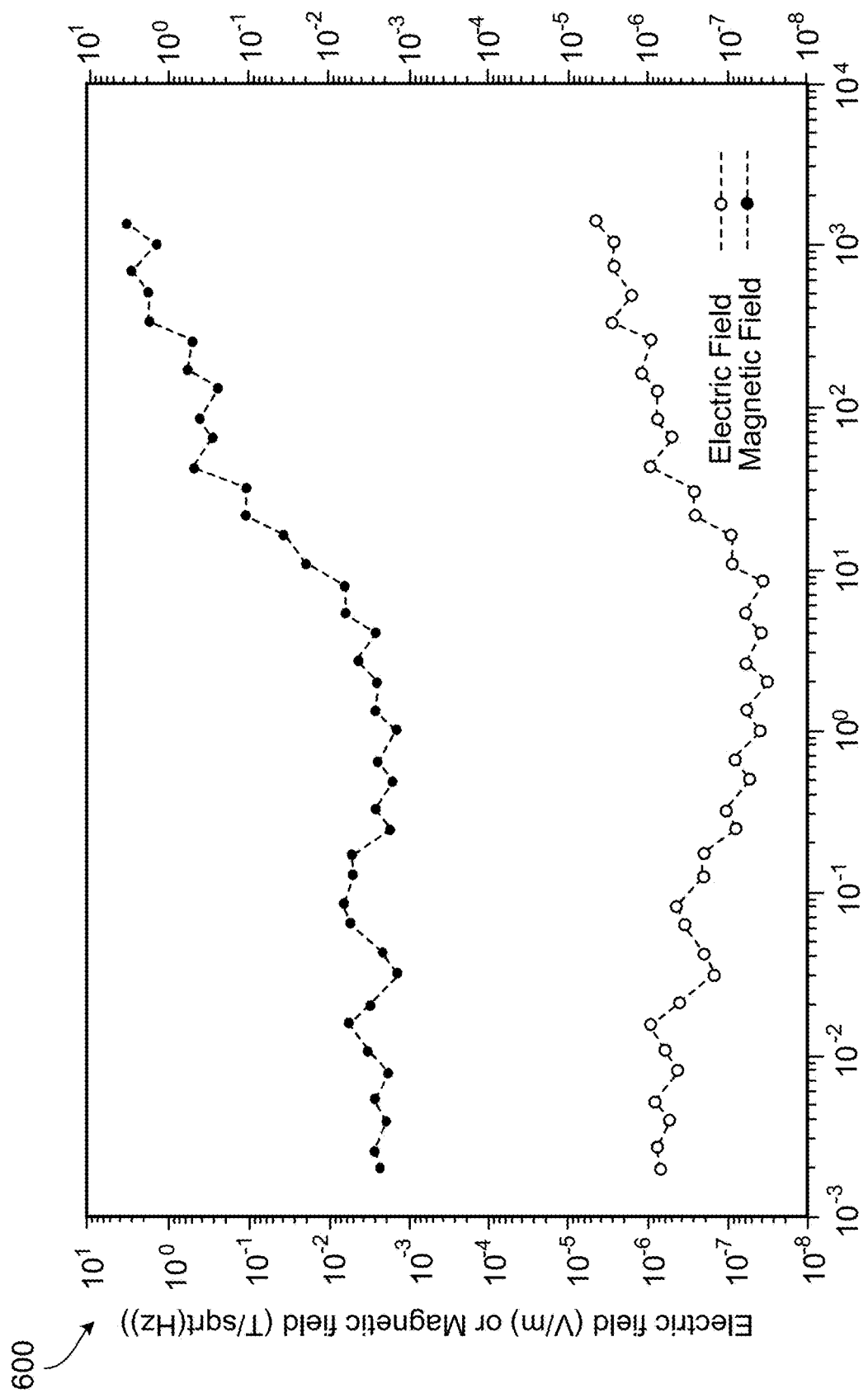
FIG. 6 is a plot of electric and magnetic fields from field observations in the formation.

The computer system 102 can determine the response function between electric and magnetic fields observed in the formation and fields observed at the surface of the earth. FIG. 6 is a plot 600 of electric and magnetic fields from field observations in the formation. In the plot 600 shown in FIG. 6, the X-axis represents the period(s) (shown on the logarithmic scale) and the Y-axis represents electric field (in Volts per meter (V/m)) or magnetic field (Tesla per square root of frequency (T/sqrt(Hz))). The computer system 102 can determine the intensity of the natural field variations using experimental surface electric and magnetic field measurements. The fields shown in FIG. 6 were derived using the response function calculated by the computer system 102 for the waterfront numerical simulation 300a and fields experimentally observed at the surface of the Earth in a Saudi Arabian oil reservoir. The fields shown in FIG. 6 plot 600 are therefore predictions of the field amplitudes that would be observed in a borehole in FIG. 3 formation 300a.

The techniques described in some implementations described earlier can be implemented if the electric and magnetic fields can be reliably measured with appropriate sensitivity in a borehole environment. Alternatively, or in addition, the magnetic field sensors can be positioned on the surface of the formation or removed completely resulting in a monitoring system that relies primarily on the electric field measured through the sensors described earlier.

The reliable measurement of the electric field under borehole conditions has been discussed in U.S. Pat. No. 8,816,689, the entire contents of which is incorporated herein by reference. The capacitive electric field sensors described in this specification do not directly contact the borehole walls to measure electric field. In some implementations, the capacitive coupling design of the sensors allows the sensors to be positioned in complete isolation, that is, without contacting any portion of the borehole wall. In some implementations, the capacitive electric field sensors can be positioned behind the casing, on the casing, on production tubing or in direct contact with the formation. Also, the capacitive electric field sensors can reliably operate even while immersed in the borehole fluids regardless of the fluid chemistry, that is, regardless of whether the fluid is water, oil, brine, gas or combinations of them.

Figure 7:
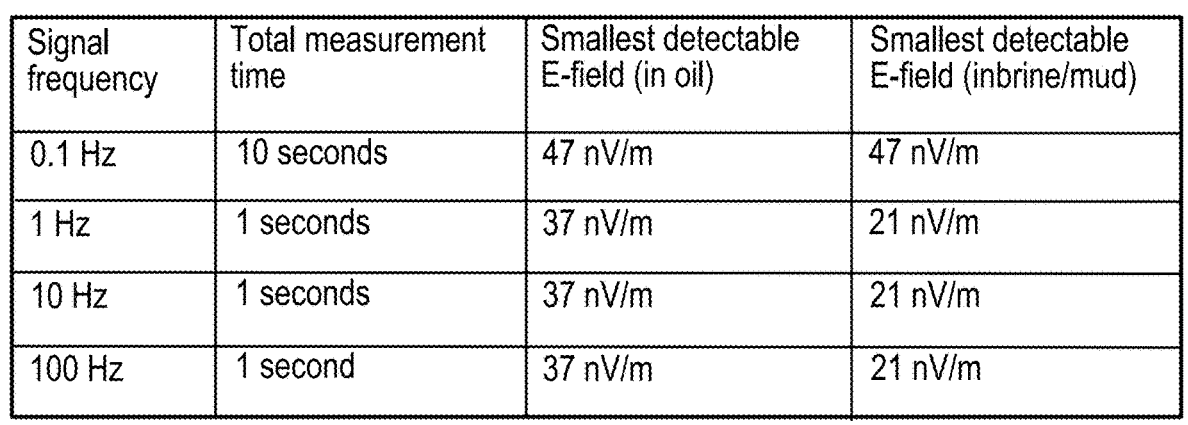
FIG. 7 is a table showing projected sensitivities in a simulated borehole environment.

FIG. 7 is a table 700 showing projected sensitivities in a simulated borehole environment based on laboratory readings. The table 700 shows smallest detectable electric fields (in nano-Volts per meter (nV/m)) in two fluids—oil and a combination of brine or mud—retrieved from a formation. For each detectable electric field, the table 700 shows the signal frequency in Hz and the total measurement time in seconds. The operating temperature of the simulated environment is about 125 degrees Celsius (° C.). The simulated environment can be reproduced in the field. That is, the derived sensitivities are for observations over separations that can be realized in a borehole in the formation 100. Because the natural electric and magnetic fields have primarily horizontal components, the electric field signal can be increased by increasing the dipole length in horizontal boreholes along one orientation and by measuring the orthogonal component across different parallel multilateral wells.

Figure 8:
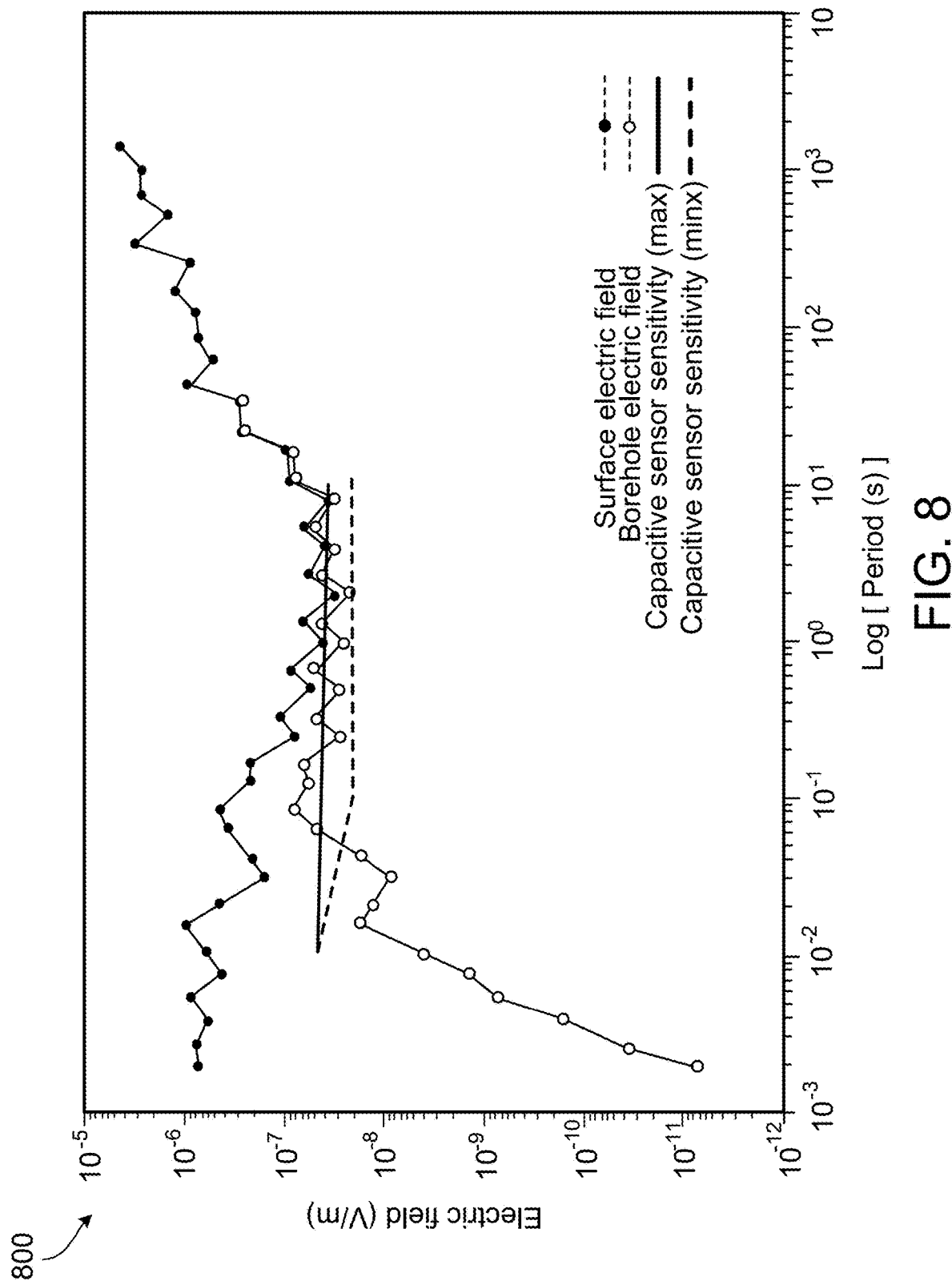
FIG. 8 is a plot comparing the sensor sensitivities shown in the table of FIG. 7 to observed electric field in the plot of FIG. 6.

FIG. 8 is a plot 800 comparing the sensor sensitivities shown in the table 700 of FIG. 7 to observed electric field in the plot 600 of FIG. 6. The simulated water front model having an overburden resistivity of 60 Ohm·m was used to calculate the attenuated borehole electric field. As shown in plot 800, the observed electric field will be equal or above the sensitivity of the capacitive sensor. During a prolonged observation period, segments having higher signal amplitude and therefore higher signal to noise ratio (SNR) can be selected for processing.

To obtain full electromagnetic measurements and an estimate of impedance, magnetic sensors can be coupled with the electric field sensors. To do so, miniaturized magnetic coils in a tri-axial configuration or a three-component fluxgate magnetometer can be included in the downhole sensor package. Alternatively, magnetic sensors can be deployed at the surface allowing bigger and higher sensitivity magnetic sensors at the surface to be combined with the capacitive electric sensors deployed within the borehole or in the formation. In such an implementation, however, sensitivity to reservoir fluid changes can be reduced despite providing a simplified downhole instrument package.

Figure 9A:
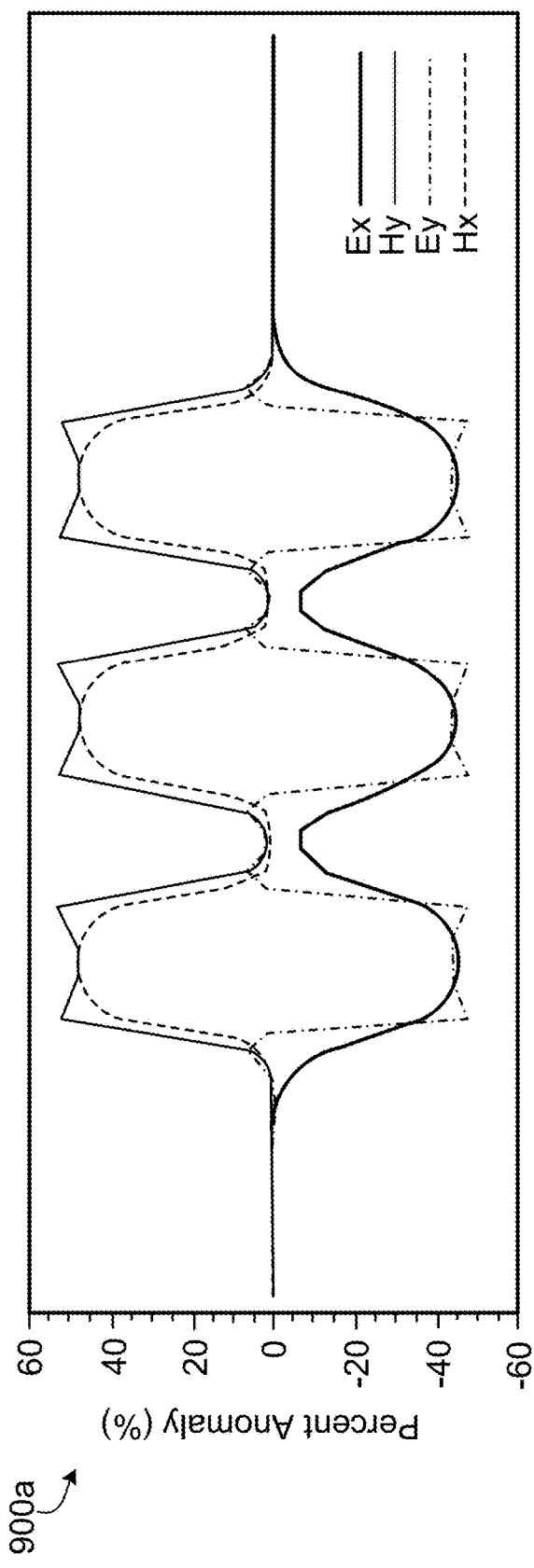
FIGS. 9A and 9B are plots show electric and magnetic fields for a simulated water flood model.
Figure 9B:
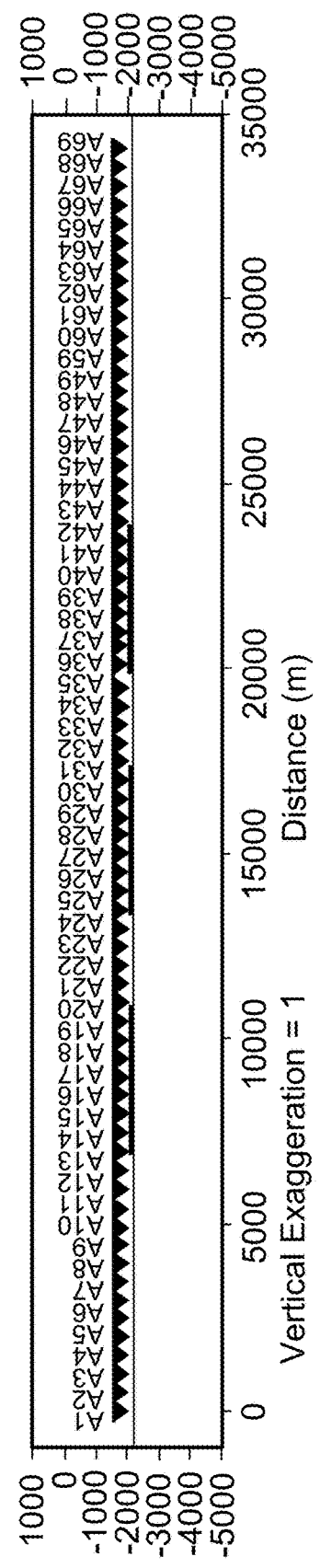

FIG. 9A is a plot showing the electric and magnetic fields for a simulated water flood model shown in FIG. 9B. The plot 900a in FIG. 9A shows the electric and magnetic fields observed at a response frequency of 10 Hz in the formation for the simulated water flood 900b. In plot 900a, the X-axis represents the position of the sensors (A-1 to A-69) in a horizontal well in the reservoir, and the Y-axis represents the percent anomaly. Locating the magnetic observations at the surface would result in a loss of sensitivity. The electric field, however, has high spatial sensitivity and contains 50 percent of the anomaly. The correct position of the magnetic observations could be added to modeling and inversion procedures to prevent errors introduced by the separation of electric and magnetic observations.

Figure 10:
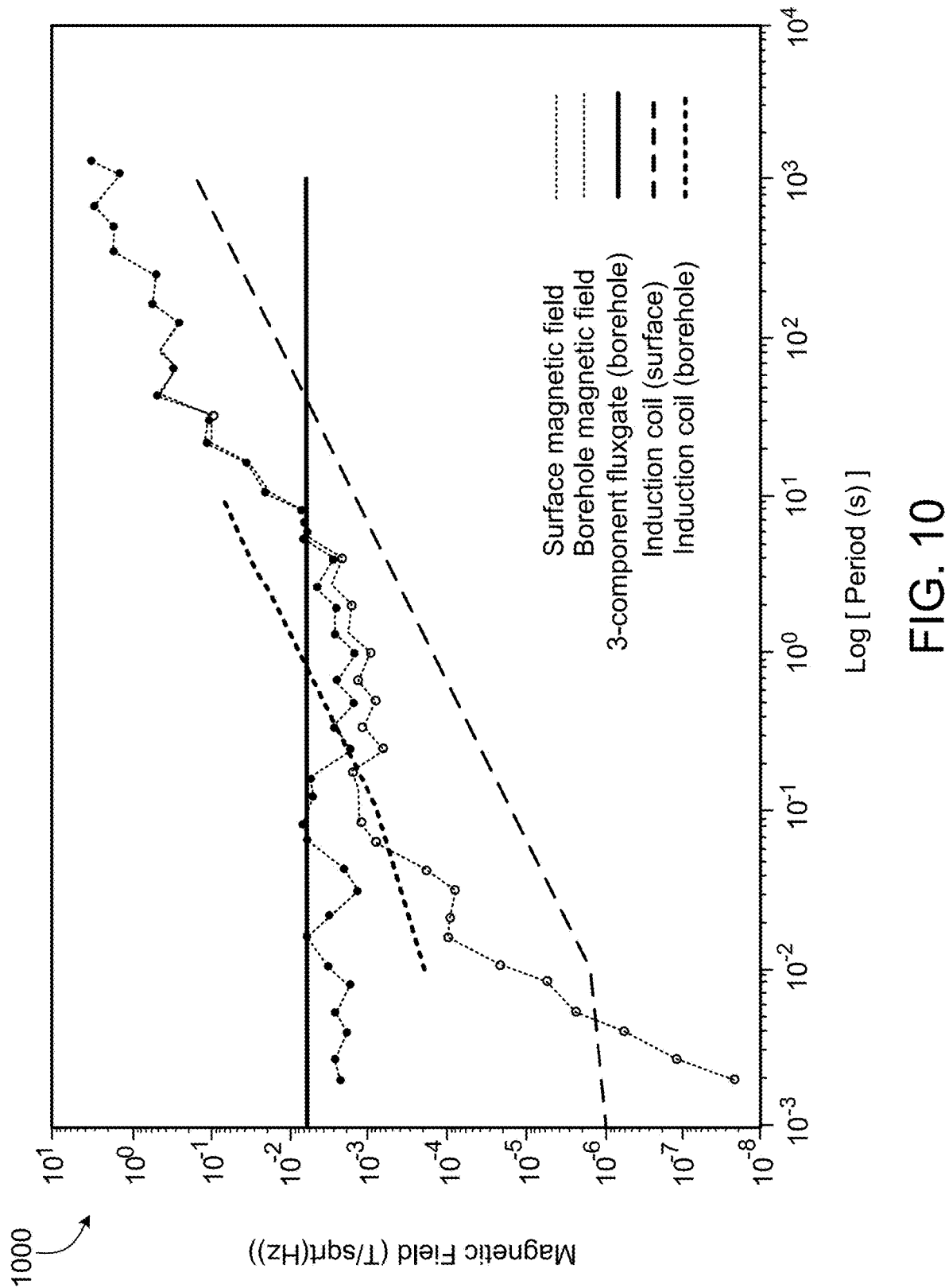
FIG. 10 is a plot comparing surface and borehole magnetic fields to sensitivities of magnetic sensors.

FIG. 10 is a plot 1000 comparing surface and borehole magnetic fields to sensitivities of magnetic sensors. In plot 1000, the X-axis shows period(s) (on a logarithmic scale) and the Y-axis shows magnetic field in T/sqrt(Hz). The magnetic sensors referenced in plot 1000 include fluxgate, surface induction coil and a borehole induction coil magnetometer. The observed magnetic field is below the sensitivity of the fluxgate magnetometer and above the sensitivity of the surface induction coil. During periods of high geomagnetic signal activity, the natural signal can be resolved with the fluxgate magnetometer. In some implementations, both surface induction coil and borehole three-component fluxgate magnetic sensors can be deployed. The fluxgate sensors can be used during time of high signal and for tool-orientation while surface observations can be used as a backup and to assist in signal amplitude monitoring and processing.

Figure 11A:
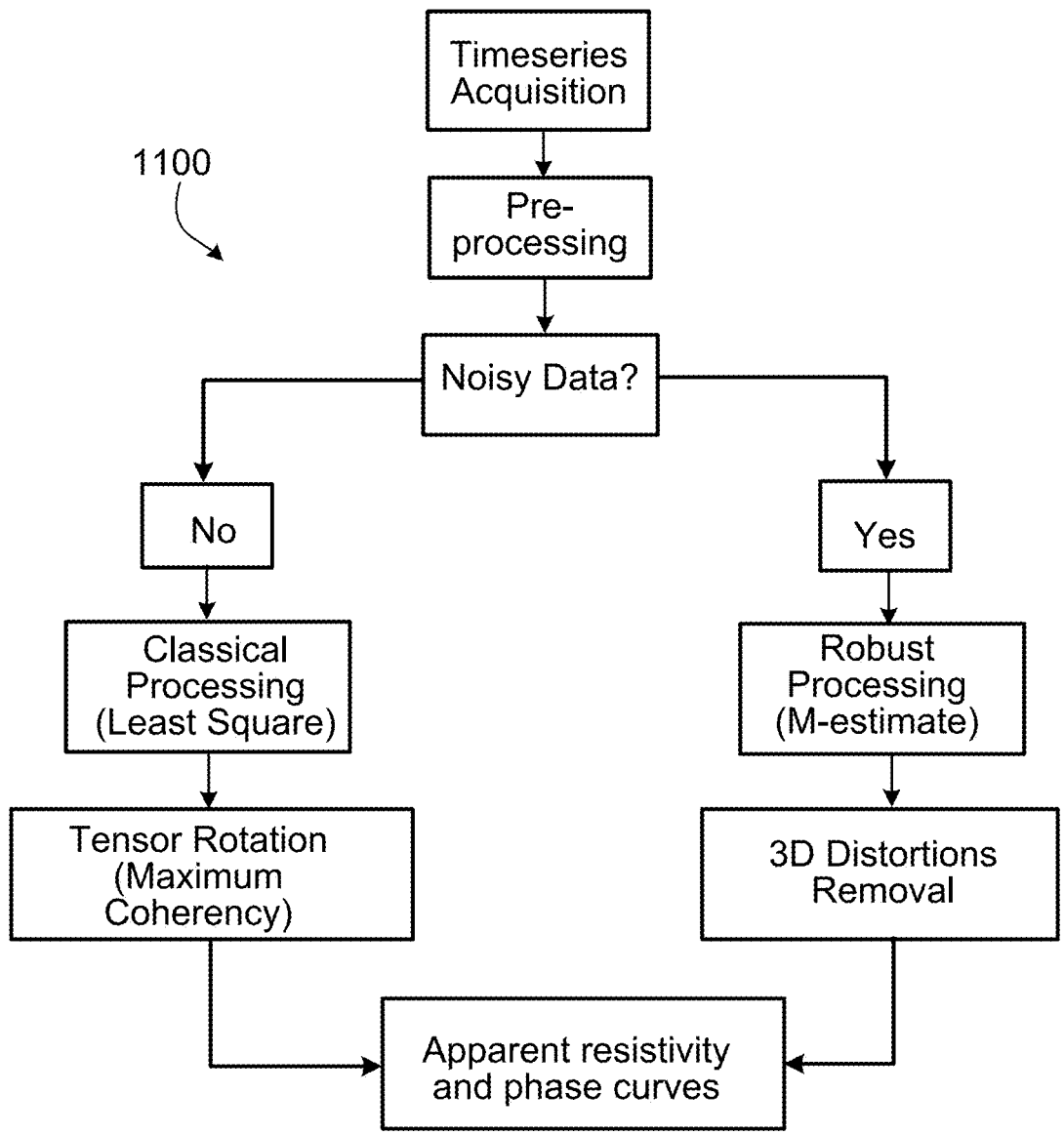
FIG. 11A is a flowchart of an example process to boost weak electromagnetic signals.
Figures 11B, 11C:
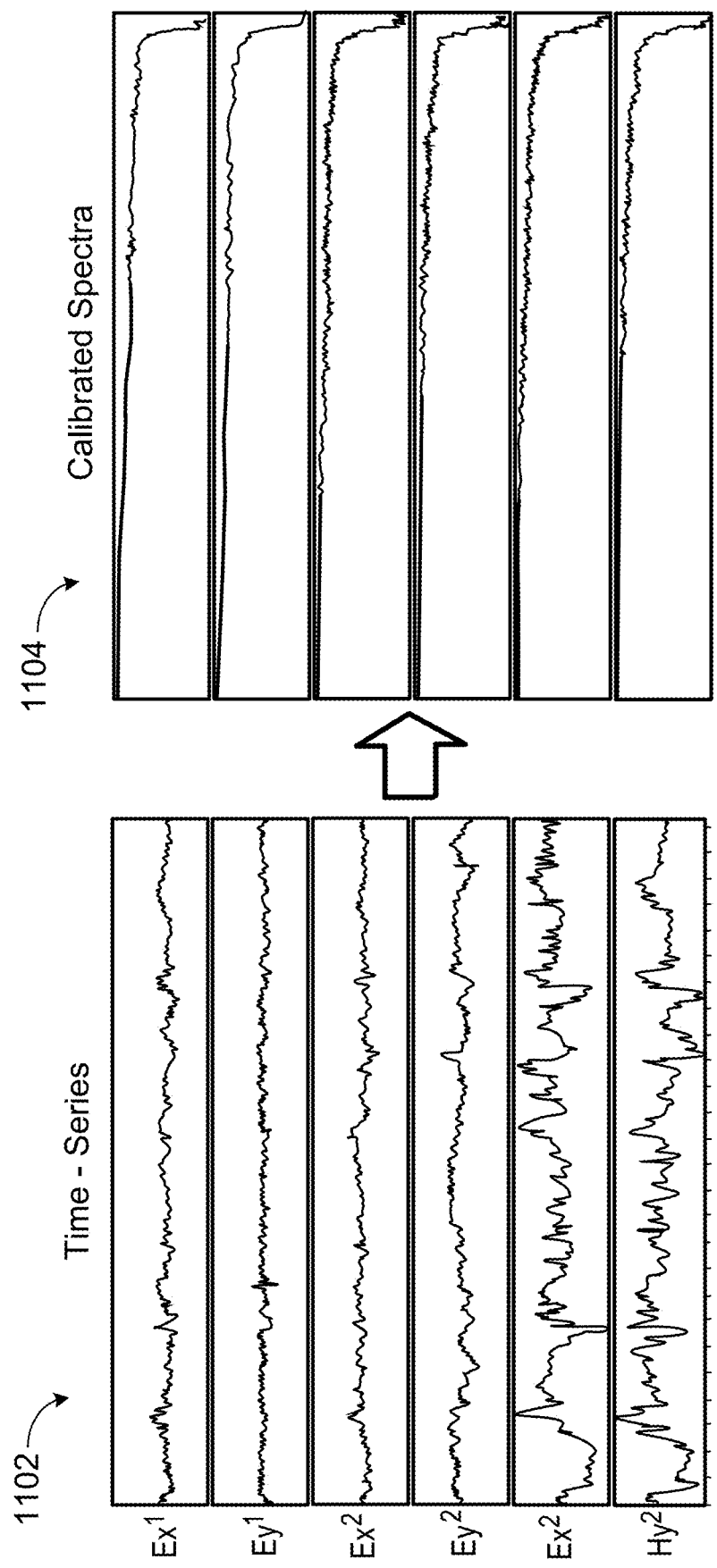
FIG. 11B shows a measured time series of electromagnetic signals.
FIG. 11C shows a plot of spectral estimates of electromagnetic signals obtained by the Fourier transform.
Figure 11D:
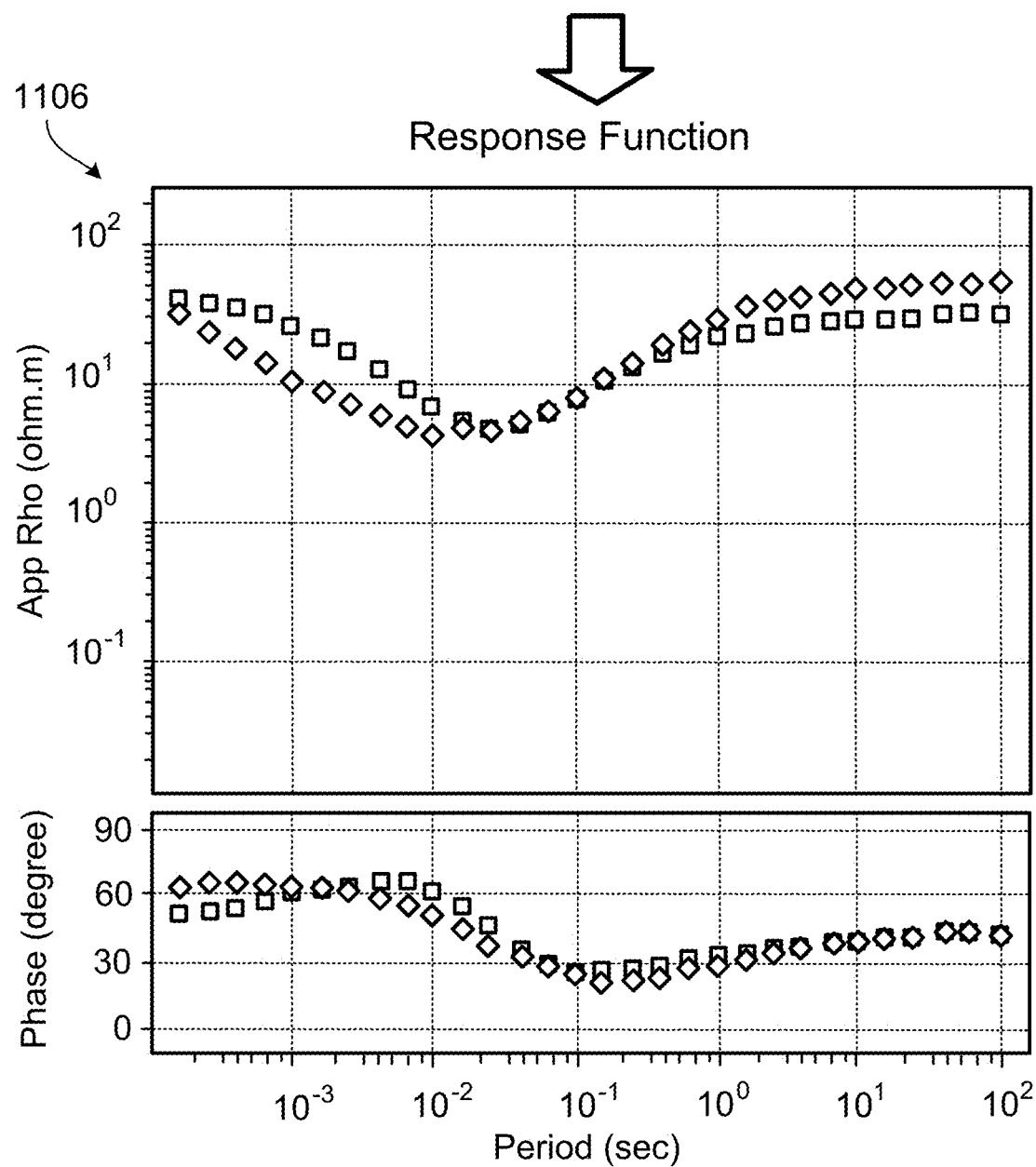
FIG. 11D shows a plot of a response function obtained by processing the spectral estimates.

FIG. 11A is a flowchart of an example process 1100 to boost weak electromagnetic signals. In some implementations, the computer system 102 can implement the process 100 to post-process passive electromagnetic data signals. The computer system 102 can receive a measured time series of electromagnetic signals. FIG. 11B shows a plot 1102 of electric and magnetic signals obtained over time. The computer system 102 can convert the measured time series to spectral estimates through a Fourier transform. FIG. 11C shows a plot 1104 of spectral estimates of electromagnetic signals obtained by the Fourier transform. The computer system 102 can combine the spectral estimates with local or distant (or both) remote reference magnetic or telluric (or both) spectral estimates to solve for impedance and magnetic transfer function estimates. The computer system 102 can perform statistical operations (for example, stacking or other statistical operations) on the spectral estimates using a robust procedure that maximizes coherency or minimizes variance (or both). FIG. 11D is a plot 1106 showing a response function obtained by processing the spectral estimates. The "response" function (or "transfer" function) is different from the raw signal (time series): it is obtained by the ratio of the frequency-domain transform of the time series. In electrically noisy areas or during periods of low geomagnetic activity, the computer system 102 can select data to be processed by implementing a predictive algorithm if the magnetic field is used to predict the electric field or vice versa. Alternatively, the computer system 102 can select the data to be processed by implementing a weighting or coherency or spectral power. In some implementations, the computer system 102 can map (for example, in three dimensions) the distribution of fluid changes in the formation 100 using the resulting data.

FIG. 12A is a sectional view of a downhole tool 1200 with an electromagnetic sensor. As shown in FIG. 12A, the downhole tool 1200 houses sensor unit 24. Sensor unit 24 comprises an elongated body 44 with an internal cavity 46. The elongated body 44 can have a curved inner surface 48 and a curved outer surface 50 to fit within the inner diameter of a well. In some implementations, the sensor unit 204 can be mounted to the outside of the production tubing; in such an implementation, the production tubing can act as the elongated body 44 where the production fluid is flowing. The sensor unit 24 communicates with an electronic communications module (for example, the computer system 102 shown in FIG. 1) by way of umbilical 30. Umbilical 30 can be, for example, an electrical umbilical and can be a tubing encased conductor 36. As shown in FIG. 12B, a tubing encased conductor 36 comprises a tube 38, which surrounds a layer of insulation 40. A conductor 42 is located within insulation 40. Returning now to FIG. 12A, umbilical 30 attaches to sensor unit 42 at upper termination nut 52. Upper termination nut 52 is located near the upper end of sensor unit 24 on an upward facing top surface of sensor unit 24. A conductor 56 exits the umbilical 30 at termination nut 52 and enters cavity 46 by way of an upper passage 54 and is communicatively associated with both a printed circuit board electronics module 60 and electromagnetic sensor 62 before passing through a lower passage 64 and connecting to umbilical 26 at lower termination nut 68. Umbilical 26 can also be a tubing encased conductor 36 (FIG. 12B). As can be seen in FIG. 12A, below upper termination nut 52, an upper bulkhead connector pressure barrier 58 seals upper passage 54 from the pressure of the downhole environment. Above lower termination nut 68, a lower bulkhead connector pressure barrier 66 seals lower passage 64 from the pressure of the downhole environment. An intermediate bulkhead connector pressure barrier 70 seals an intermediate passage 72 from the pressure of the downhole environment. The upper passage 54, lower passage 64 and intermediate passage 72 are the only openings to internal cavity 46. The combination of barriers 58, 66 and 70 effectively seal internal cavity 46 from the high pressures of the downhole environment, allowing the internal cavity 46 to be maintained at atmospheric pressure to protect the [PCB] electronics module 60 and any other electronic components housed within internal cavity 46 from excessive pressures. Outside of internal cavity 46 in a recess 74 formed in the outer side 50 of sensor unit 24.

At least one electromagnetic sensor 62 is located within recess 74. Insulators 76 are located above and below sensor 62 within recess 74. Electromagnetic sensor 62 is a low-frequency tri-axial capacitive electrode sensor, capable of collecting and reporting the electrical fields in 3 dimensions, the magnetic field in 3 dimensions, and the change in magnetic field in three dimensions over time. Electromagnetic sensor 62 can collect both frequency and time-domain electromagnetic field data. The ability of electromagnetic sensor 62 does not depend on the chemical environment surrounding the sensor 62 or on the local wellbore temperature or humidity. Sensor 62 is capable of operating in dry conditions without electrolyte, such as that used in a conventional porous pot electrode, to operate, and so can be deployed permanently at the surface or at the reservoir level without need, of significant routine maintenance. Electromagnetic sensor 62 can either be in contact with the formation (reservoir) or completely isolated from the interior surface of the wellbore. The coupling of the electromagnetic sensor 62 with the environment is entirely electromagnetic, and no ionic exchange is required.

Also, in the downhole tool 1200, the capacitive electrode positions will be separated by a large dipole distance along the well, for example, in the order of tens to hundreds of meters or kilometers, to measure passive electromagnetic signals. The capacitive sensor can be separated by two insulators, and the signal can be conducted via insulated wires to the PCB electronics module 60, which can include several systems including power supply, analog-to-digital converters (A/D), signal conditioners, and amplifiers. The PCB electronics module 60 can also include a modem to multiplex power and telemetry communications on a single wire or twisted pair for transmission two-way to surface and borehole. The telemetry can be demodulated at the surface by another modem.

In some implementations, the electric field can be measured using other devices not specifically operating with the capacitive technology. The magnetic field itself does not require any contact with the borehole environment to be measured. In some implementations, the borehole sensors can include the electric field sensors only with the magnetic field sensors being located at the surface or in a location different from the electric field sensors. The fields shown in FIG. 6. were derived using the response function calculated by the computer system 102 for the waterfront numerical simulation 300a and fields experimentally observed at the surface of the Earth in a Saudi Arabian oil reservoir. The fields shown in FIG. 6 plot 600 are therefore predictions of the field amplitudes that would be observed in a borehole in formation 300a. In general, for electric field sensors located within the borehole and magnetic field sensors located at the surface or in a nearby well, the anomalous impedance can be evaluated with approximately half of its magnitude. The reduction in the observed anomaly can be accounted for through three dimensional analysis of the observed response functions. If the magnetic field measurement is not co-located with the electric field measurement, part of the anomaly will not be measured, but 3D modeling/inversion can still recover the reservoir fluid change.

The downhole sensors can be arranged as a single sensor, a string of inter-connected sensors, as separate and independent sensor packages or as combinations of them. The techniques described here can be implemented as a retrievable borehole tool, for example, to perform passive electromagnetic logging in boreholes, or as devices installed permanently in the formation. The electromagnetic signals measured by the sensors can be transmitted to the surface by borehole telemetry. Alternatively, or in addition, the computer system 102 can be disposed within the borehole such that impedance determination and other post-processing can be implemented directly within the borehole.

In some implementations, the sensors can be deployed in conjunction with an electrically-controlled intelligent completion system with an electrical umbilical to the surface. Such implementations can combine deep water flood front sensing and multiple zone well flow control to realize a proactive formation management system that can enable making well flow adjustments prior to water breakthrough to the wellbore. Such implementations can maximize field recovery and result in very little hydrocarbons being left behind in the formation.

Returning to FIG. 1, in some implementations, the computer system 102 can be implemented in digital electronic circuitry, or in computer software, firmware, or hardware, including the structures disclosed in this specification and their structural equivalents, or in combinations of one or more of them. The computer system 102 can be implemented as one or more computer programs, that is, one or more modules of computer program instructions, encoded on computer storage medium for execution by, or to control the operation of, data processing apparatus. Alternatively, or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described as being performed by the computer system 102 can be implemented as operations performed by one or more processors (sometimes called data processing apparatus) on data stored on one or more computer-readable storage devices or received from other sources.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

The invention claimed is:

1. A method of monitoring a hydrocarbon-bearing formation, the method comprising:

measuring, by an electromagnetic sensor positioned adjacent a borehole in the hydrocarbon-bearing formation, passive, naturally-occurring, electromagnetic signals generated by interaction of solar wind with earth's magnetosphere adjacent the borehole;

measuring over a period of time, by a borehole sensor positioned within the borehole, electromagnetic signals generated within the borehole, wherein the electromagnetic signals change over the period of time due to variations in fluid distributions within the hydrocarbon-bearing formation, wherein the electromagnetic signals are measured over a range of frequencies over the period of time;

determining, by one or more processors, electromagnetic changes to the electromagnetic signals generated within the borehole and to the passive, naturally-occurring electromagnetic signals over the period of time; and generating a computational model of the hydrocarbon-bearing formation based in part on the electromagnetic changes, wherein determining the electromagnetic changes to the electromagnetic signals over the period of time comprises:

determining, from among the range of frequencies, a sub-range of frequencies at which a majority of the electromagnetic changes over the period of time were measured and a magnitude of the electromagnetic changes at the sub-range of frequencies;

numerically determining an attenuation of changes to the passive, naturally-occurring electromagnetic signals over the period of time based on the sub-range of frequencies and based on a resistivity of the hydrocarbon-bearing formation; and determining an intensity of electric and magnetic field variations resulting from the naturally-occurring electromagnetic signals to determine corresponding field variations within the borehole.

2. The method of claim 1, wherein the electromagnetic signals are naturally generated and measured within the borehole.

3. The method of claim 1, wherein the borehole sensor comprises a tri-axial electromagnetic sensor configured to measure magnetic signals and electric field signals within the borehole.

4. The method of claim 1, wherein either the electromagnetic sensor or the borehole sensor comprises a capacitive electric sensor.

5. The method of claim 1, wherein the period of time over which the electromagnetic signals are measured is in an order of weeks or more.

6. The method of claim 1, wherein determining the electromagnetic changes to the electromagnetic signals over the period of time comprises:
for a plurality of time instants in the period of time:
identifying an electromagnetic signal value measured at each time instant of the plurality of time instants; and
identifying a passive, naturally-occurring, electromagnetic signal measured at each corresponding time instant of the plurality of time instants; and
determining a ratio of the electromagnetic signal value and the passive, naturally-occurring, electromagnetic signal measured at each corresponding time instant of the plurality of time instants.

7. The method of claim 1 further comprising:
processing the passive, naturally-occurring, electromagnetic signals generated by the interaction of solar wind with earth's magnetosphere adjacent the borehole by stacking to reduce an effect of noise; and
processing the electromagnetic signals generated within the borehole by stacking to reduce an effect of noise.

8. A hydrocarbon-bearing formation monitoring system comprising:
an electromagnetic sensor positioned adjacent to a borehole formed in a hydrocarbon-bearing formation, the electromagnetic sensor configured to measure passive, naturally-occurring, electromagnetic signals generated by interaction of solar wind with earth's magnetosphere adjacent the borehole, wherein the electromagnetic sensor comprises:
a first capacitive electric-field sensor comprising:
a first plurality of plates configured to detect fluctuating passive, naturally-occurring electric signals adjacent the borehole, and
first electrical circuitry connected to the first plurality of plates, wherein the fluctuating passive, naturally-occurring electric signals induce a first displacement current in the first electrical circuitry;
a borehole sensor positioned within the borehole, the borehole sensor configured to measure, over a period of time, electromagnetic signals generated within the borehole, wherein the electromagnetic signals change over the period of time due to variations in fluid distributions within the hydrocarbon-bearing formation; and a computer system comprising:
one or more processors; and
a computer-readable medium storing instructions executable by the one or more processors to perform operations comprising:
determining electromagnetic changes to the electromagnetic signals generated within the borehole and to the passive, naturally-occurring electromagnetic signals over the period of time; and
generating a computational model of the hydrocarbon-bearing formation based in part on the electromagnetic changes.

9. The system of claim 8, wherein the borehole sensor comprises:
a second capacitive electric-field sensor comprising:
a second plurality of plates configured to receive fluctuating electric signals from within the borehole, and
second electrical circuitry connected to the second plurality of plates, wherein the fluctuating electric signals induce a second displacement current in the second electrical circuitry.

10. The system of claim 9, wherein the electromagnetic changes to the electromagnetic signals generated within the borehole and to the passive, naturally-occurring electromagnetic signals over the period of time are determined based on the first displacement current and the second displacement current.

11. The system of claim 8, wherein the borehole sensor comprises a tri-axial electromagnetic sensor configured to measure magnetic signals and electric signals within the borehole.

12. The system of claim 8, wherein determining electromagnetic changes to the electromagnetic signals generated within the borehole and to the passive, naturally-occurring electromagnetic signals over the period of time comprises:
determining ratios of the electromagnetic signals generated within the borehole and the passive, naturally-occurring electromagnetic signals over the period of time; and
determining an impedance of the hydrocarbon-bearing formation in which the borehole is formed based on the determined ratios.

13. The system of claim 8, wherein the period of time over which the electromagnetic signals are measured is in an order of weeks or more.

14. The system of claim 8, wherein each of the electromagnetic sensor and the borehole sensor is configured to measure electromagnetic signals over a range of frequencies over the period of time.

15. The system of claim 14, wherein determining the electromagnetic changes to the electromagnetic signals over the period of time comprises:
determining, from among the range of frequencies, a sub-range of frequencies at which a majority of the electromagnetic changes over the period of time were measured and a magnitude of the electromagnetic changes at the sub-range of frequencies;
numerically determining a skin depth of changes to the passive, naturally-occurring electromagnetic signals over the period of time based on the sub-range of frequencies and based on a resistivity of the hydrocarbon-bearing formation; and
determining an intensity of electric and magnetic field variations resulting from the naturally-occurring electromagnetic signals to determine corresponding field variations within the borehole.

16. A hydrocarbon-bearing formation monitoring system comprising:
an electromagnetic sensor positioned adjacent to a borehole formed in a hydrocarbon-bearing formation, the electromagnetic sensor configured to measure passive, naturally-occurring, electromagnetic signals generated by interaction of solar wind with earth's magnetosphere adjacent the borehole, the electromagnetic sensor comprising:
a first capacitive electric-field sensor comprising:
a first plurality of plates configured to detect fluctuating passive, naturally-occurring electric signals adjacent the borehole, and
first electrical circuitry connected to the first plurality of plates, wherein the fluctuating passive, naturally-occurring electric signals induce a first displacement current in the first electrical circuitry;
a borehole sensor positioned within the borehole, the borehole sensor configured to measure, over a period of time, electromagnetic signals generated within the borehole, wherein the electromagnetic signals change over the period of time due to variations in fluid distributions within the hydrocarbon-bearing formation, the borehole sensor comprising:
a second capacitive electric-field sensor comprising:
a second plurality of plates configured to receive fluctuating electric signals from within the borehole, and
second electrical circuitry connected to the second plurality of plates, wherein the fluctuating electric signals induce a second displacement current in the second electrical circuitry; and
a computer system comprising:
one or more processors; and
a computer-readable medium storing instructions executable by the one or more processors to perform operations comprising:
determining electromagnetic changes to the electromagnetic signals generated within the borehole and to the passive, naturally-occurring electromagnetic signals over the period of time; and
generating a computational model of the hydrocarbon-bearing formation based in part on the electromagnetic changes.

17. The system of claim 16, wherein the electromagnetic changes to the electromagnetic signals generated within the borehole and to the passive, naturally-occurring electromagnetic signals over the period of time are determined based on the first displacement current and the second displacement current.

* * * * *